US012072615B2

(12) United States Patent
Okubo et al.

(10) Patent No.: US 12,072,615 B2
(45) Date of Patent: Aug. 27, 2024

(54) PROJECTION OPTICAL APPARATUS THAT IS REMOVABLE INSTALLED IN A LIGHT EMITTING APPARATUS AND PROJECTOR

(71) Applicant: SEIKO EPSON CORPORATION, Tokyo (JP)

(72) Inventors: Hirofumi Okubo, Matsumoto (JP); Naoto Takehana, Azumino (JP); Kosho Kamijo, Yamagata-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/563,216

(22) Filed: Dec. 28, 2021

(65) Prior Publication Data

US 2022/0206242 A1 Jun. 30, 2022

(30) Foreign Application Priority Data

Dec. 28, 2020 (JP) ................................ 2020-218637

(51) Int. Cl.
*G03B 21/14* (2006.01)
*G03B 21/28* (2006.01)
*G02B 7/02* (2021.01)
*G02B 17/08* (2006.01)

(52) U.S. Cl.
CPC ........... *G03B 21/145* (2013.01); *G03B 21/28* (2013.01); *G02B 7/021* (2013.01); *G02B 17/08* (2013.01)

(58) Field of Classification Search
CPC ...... G03B 21/145; G03B 21/28; G02B 23/08; G02B 23/00; G02B 23/02; G02B 23/16
See application file for complete search history.

(56) References Cited

U.S. PATENT DOCUMENTS

| | | | |
|---|---|---|---|
| 6,364,491 B1 | 4/2002 | Okada et al. | |
| D878,452 S | * 3/2020 | Tanaka | ......................... D16/235 |
| 11,385,531 B2 | * 7/2022 | Yamamoto | ........... G03B 21/008 |
| 2004/0032570 A1 | 2/2004 | Peterson et al. | |
| 2004/0032653 A1 | 2/2004 | Gohman | |
| 2004/0223123 A1 | 11/2004 | Engle et al. | |
| 2004/0233394 A1 | 11/2004 | Gohman | |
| 2004/0257539 A1 | 12/2004 | Peterson et al. | |
| 2006/0029089 A1 | 2/2006 | Zellner et al. | |
| 2007/0146652 A1 | 6/2007 | Peterson et al. | |
| 2015/0042965 A1 | 2/2015 | Peterson et al. | |
| 2016/0070158 A1 | 3/2016 | Peterson et al. | |
| 2016/0341943 A1 | 11/2016 | Peterson et al. | |
| 2016/0342075 A1 | 11/2016 | Peterson et al. | |
| 2019/0025679 A1 | * 1/2019 | Kuroda | .................. G03B 21/14 |
| 2019/0113726 A1 | 4/2019 | Peterson et al. | |

(Continued)

FOREIGN PATENT DOCUMENTS

| | | | |
|---|---|---|---|
| CN | 213067531 U | * | 4/2021 |
| JP | 08068928 A | * | 3/1996 |
| JP | 2000206588 A | * | 7/2000 |

(Continued)

*Primary Examiner* — Bao-Luan Q Le
(74) *Attorney, Agent, or Firm* — Dority & Manning, P.A.

(57) ABSTRACT

A projection optical apparatus is removably installed in a light emitting apparatus and projects light emitted from the light emitting apparatus. The projection optical apparatus includes a plurality of lenses, a lens barrel holding the plurality of lenses, and a first grip extending outward from the exterior of the lens barrel.

10 Claims, 9 Drawing Sheets

(56) References Cited

U.S. PATENT DOCUMENTS

2021/0149284 A1 * 5/2021 Yamamoto ........... G03B 21/142

FOREIGN PATENT DOCUMENTS

| | | | |
|---|---|---|---|
| JP | 2000356732 A | * | 12/2000 |
| JP | 2001-166380 | | 6/2001 |
| JP | 2007-525700 A | | 9/2007 |
| JP | 2008020833 A | * | 1/2008 |
| JP | 2010-169915 A | | 8/2010 |
| JP | 4833757 B2 | * | 12/2011 |
| JP | 2016-133703 A | | 7/2016 |
| JP | 2019-002969 | | 1/2019 |

* cited by examiner

PROJECTION OPTICAL APPARATUS THAT IS REMOVABLE INSTALLED IN A LIGHT EMITTING APPARATUS AND PROJECTOR

The present application is based on, and claims priority from JP Application Serial Number 2020-218637, filed Dec. 28, 2020, the disclosure of which is hereby incorporated by reference herein in its entirety.

BACKGROUND

1. Technical Field

The present disclosure relates to a projection optical apparatus and a projector.

2. Related Art

There has been a known projector including a light source, a light modulator that modulates the light outputted from the light source, and a projection optical apparatus that projects the light modulated by the light modulator (see JP-A-2001-166380, for example).

In addition to the configuration described above, the projector described in JP-A-2001-166380 includes an optical base to which liquid crystal panels, which form the light modulator, are fixed. The optical base includes a prism mount, a holding base perpendicular to the prism mount, and auxiliary plates disposed on opposite sides of the holding base. A lens holder is held by the holding base and the auxiliary plates so as to be vertically slidable. The lens holder includes an outer tubular section with an opening.

A projection lens section that is the projection optical apparatus is formed of a plurality of outer lens barrels, an inner lens barrel, and a plurality of lenses. The projection lens section is held by the lens holder with a male threaded portion of the inner lens barrel rotated so that the male threaded portion engages with a female threaded portion provided at the outer tubular portion.

The projection lens section can be replaced via the front surface of the projector by rotating the projection lens section to release the engagement between the male threaded portion and the female threaded portion.

In recent years, the size of projection optical apparatuses has been increasing, which has made it difficult to handle the projection optical apparatuses. For example, it has become difficult to handle a projection optical apparatus when installed in or removed from a projector. There has therefore been a demand for a projection optical apparatus configured to be readily handled. In other words, there has been a demand for a projection optical apparatus that can be readily gripped.

SUMMARY

A projection optical apparatus according to a first aspect of the present disclosure is removably installed in a light emitting apparatus and projects light emitted from the light emitting apparatus. The projection optical apparatus includes a plurality of lenses, a lens barrel holding the plurality or lenses, and a first grip extending outward from an exterior of the lens barrel.

A projector according to a second aspect of the present disclosure includes a light exiting apparatus including a light modulator modulating light emitted from a light source and the projection optical apparatus described above.

DESCRIPTION OF EXEMPLARY EMBODIMENTS

An embodiment of the present disclosure will be described below with reference to the drawings.

Schematic Configuration of Projector

Figure 1:
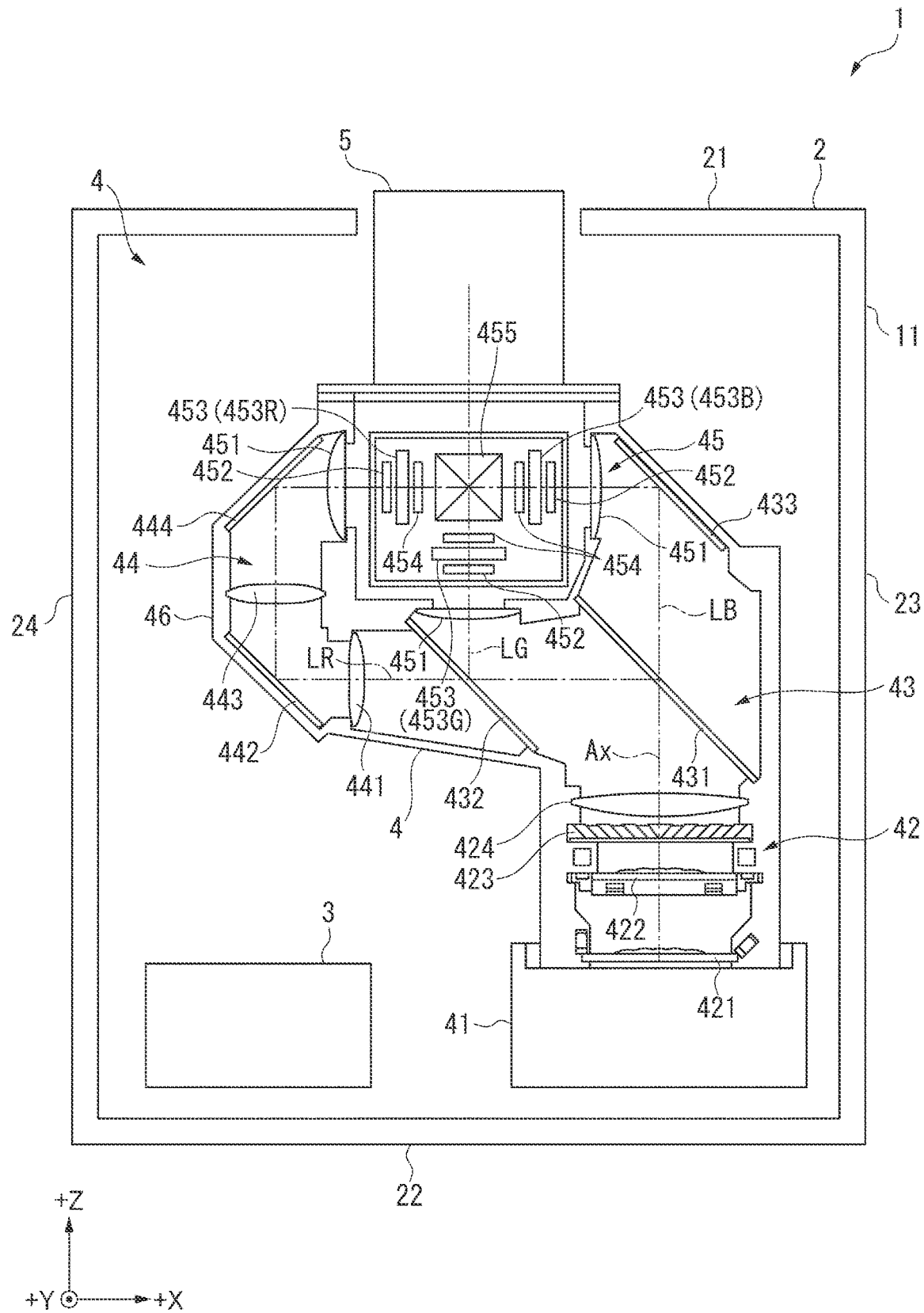
FIG. 1 is a diagrammatic view showing the configuration of a projector according to an embodiment.

FIG. 1 is a diagrammatic view showing the configuration of a projector 1 according to the present embodiment.

The projector 1 according to the present embodiment modulates light outputted from a light source 41 in accordance with image information, enlarges the modulated light, and projects the enlarged light on a projection receiving surface, such as a screen. The projector 1 includes a light emitting apparatus 11 and a projection optical apparatus 5, which is removably installed in the light emitting apparatus 11, as shown in FIG. 1.

Configuration of Light Emitting Apparatus

The light emitting apparatus 11 emits image light that forms an image. The light emitting apparatus 11 includes an exterior enclosure 2, and a controller 3 and an image generator 4 accommodated in the exterior enclosure 2. In addition to the above, the light emitting apparatus 11 includes, although not shown, an installation and removal mechanism that installs and removes the projection optical apparatus 5, a power supply that supplies electronic parts that form the projector 1 with electric power, and a cooler that cools cooling targets that form the projector 1.

Configuration of Exterior Enclosure

The exterior enclosure 2 has a front surface 21, a rear surface 22, a left side surface 23, and a right side surface 24, further has a top surface 25 and a bottom surface 26 (see FIG. 2), which are not shown in FIG. 1, and is formed in a substantially box-like shape. The exterior enclosure 2 is provided with, although not shown, an operation panel coupled to the controller, a light receiver, and a coupling terminal.

Configuration of Controller

The controller 3 includes an arithmetic processor, such as a CPU (central processing unit), and controls the projector 1. For example, the controller 3 operates the projector 1 based on an operation signal inputted from the operation panel and an operation signal outputted from a remote control and received by the light receiver. When an imaging apparatus is coupled to the projector 1, the controller 3 can adjust based on a captured image inputted from the imaging apparatus an image projected by the projection optical apparatus 5 on the projection receiving surface. For example, the controller 3 performs adjustment, such as keystone correction that is correction of trapezoidal distortion of the projected image and correction of the colors of the projected image, based on the captured image from the imaging apparatus.

Configuration of Image Generator

The image generator 4 generates image light according to image information (including image signal) inputted from the controller 3 and outputs the generated image light to the projection optical apparatus 5. The image generator 4 includes the light source 41, a homogenizer 42, a color separator 43, a relay apparatus 44, an image formation apparatus 45, and an optical part enclosure 46.

The light source 41 outputs illumination light to the homogenizer 42. The configuration of the light source 41 may, for example, include a solid-state light source that outputs blue light that is excitation light and a wavelength converter that converts in terms of wavelength part of the blue light outputted from the solid-state light source into fluorescence containing green light and red light. The configuration of the light source 41 may instead include a light source lamp, such as an ultrahigh pressure mercury lamp, and may still instead include solid light sources that individually output blue light, green light, and red light.

The homogenizer 42 homogenizes the illuminance of the luminous flux incident from the light source 41. The homogenizer 42 includes a first lens array 421, a second lens array 422, a polarization converter 423, and a superimposing lens 424.

The color separator 43 separates the luminous flux incident from the homogenizer 42 into red light LR, green light LG, and blue light LB. The color separator 43 includes dichroic mirrors 431 and 432 and a reflection mirror 433.

The relay apparatus 44 is provided in the optical path of the red light LR, which is longer than the optical paths of the blue light LB and the green light LG, and suppresses loss of the red light LR. The relay apparatus 44 includes a light-incident-side lens 441, a reflection mirror 442, a relay lens 443, and a reflection mirror 444. Instead, the blue light LB may be set to have a longer optical path than the other color light, and the relay apparatus 44 may be provided in the optical path of the blue light LB.

The image formation apparatus 45 modulates the blue light LB, the green light LG, and the red light LR incident thereon and combines the modulated blue light LB, green light LG, and red light LR with one another to form image light. The image formation apparatus 45 includes field lenses 451, light-incident-side polarizers 452, light modulators 453, and light-exiting-side polarizers 454, which are provided for the respective color light LB, LG and LR, and further includes one light combiner 455.

The light modulators 453 modulate the light outputted from the light source 41 in accordance with the image information. The light modulators 453 include a blue light modulator 453B, which modulates the blue light LB, a green light modulator 453G, which modulates the green light LG, and a red light modulator 453R, which modulates the red light LR. In the present embodiment, the light modulators 453 are each formed of a transmissive liquid crystal panel, and the light-incident-side polarizers 452, the light modulators 453, and the light-exiting-side polarizers 454 form liquid crystal light valves.

The light combiner 455 combines the color light modulated by the light modulator 453B, the color light modulated by the light modulator 453G, and the color light modulated by the light modulator 453R with one another to form image light. The light combiner 455 outputs the formed image light to the projection optical apparatus 5. The light combiner 455 is formed of a cross dichroic prism, but not necessarily, and can instead be formed, for example, of a plurality of dichroic mirrors.

The optical part enclosure 46 holds the apparatuses 42 to 44 and the field lenses 451 described above. An illumination optical axis Ax, which is the optical axis in the design stage, is set in the image generator 4, and the optical part enclosure 46 holds the apparatuses 42 to 44 and the field lenses 451 described above in predetermined positions on the illumination optical axis Ax. The light source 41, the image formation apparatus 45, and the projection optical apparatus 5 are disposed in predetermined positions on the illumination optical axis Ax.

In the following description, three directions perpendicular to one another are called directions +X, +Y, and +Z. The direction +Z is the direction from the rear surface 22 toward the front surface 21, which is the direction in which the image generator 4 outputs the image light, and the direction +Y is the direction from the bottom surface 26 toward the top surface 25. The direction +X is the leftward direction in a case where the projector 1 is viewed from the negative side in the direction Z with the direction +Y oriented upward.

The direction opposite to the direction +X is a direction −X, the direction opposite to the direction +Y is a direction −Y, and the direction opposite to the direction +Z is a direction −Z.

The terra "perpendicular" refers to intersecting at right angles.

Configuration of Projection Optical Apparatus

Figure 2:
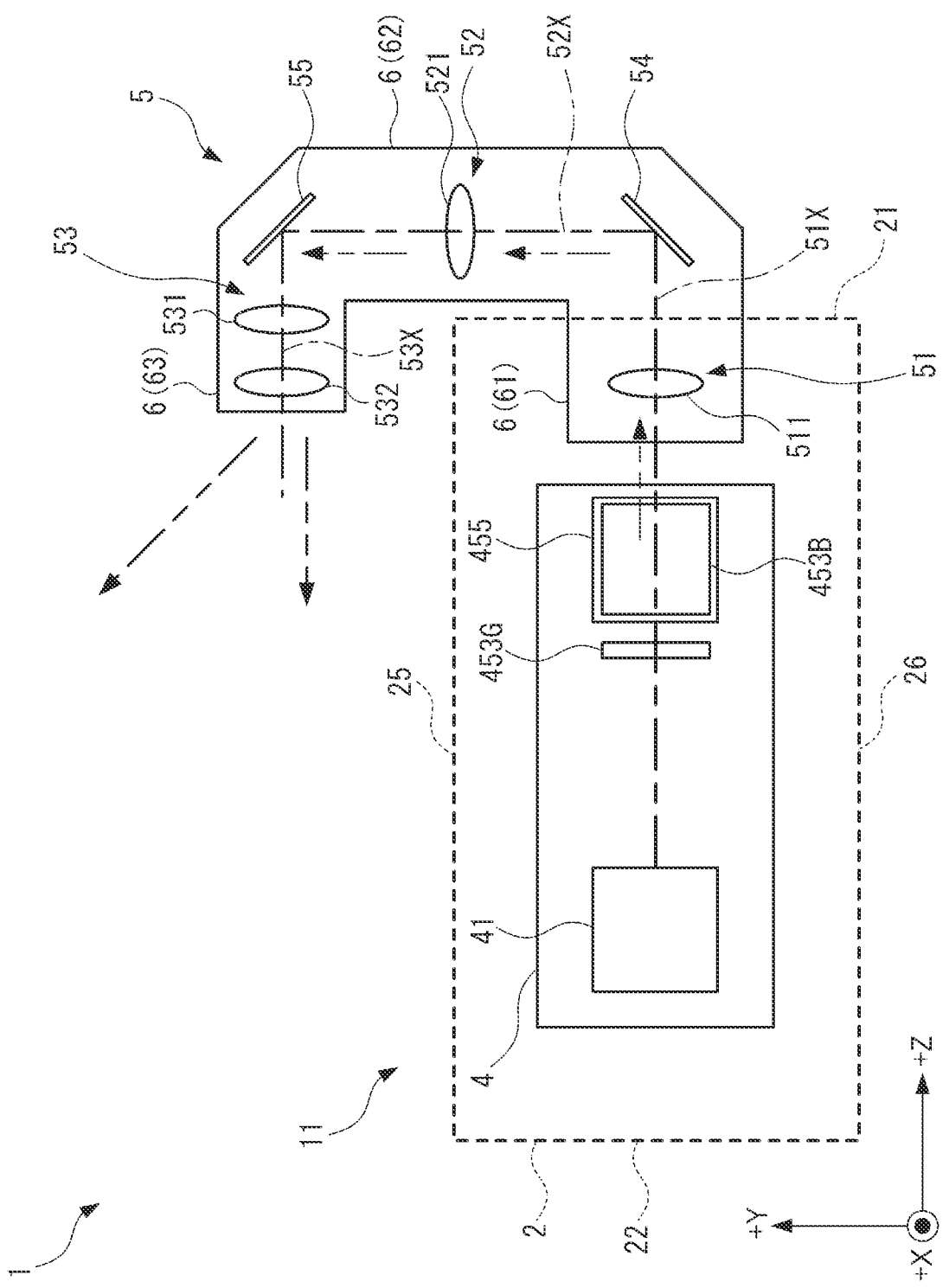
FIG. 2 is a side view of the projector according to the embodiment viewed from the side facing the left side surface of the projector.
Figure 3:
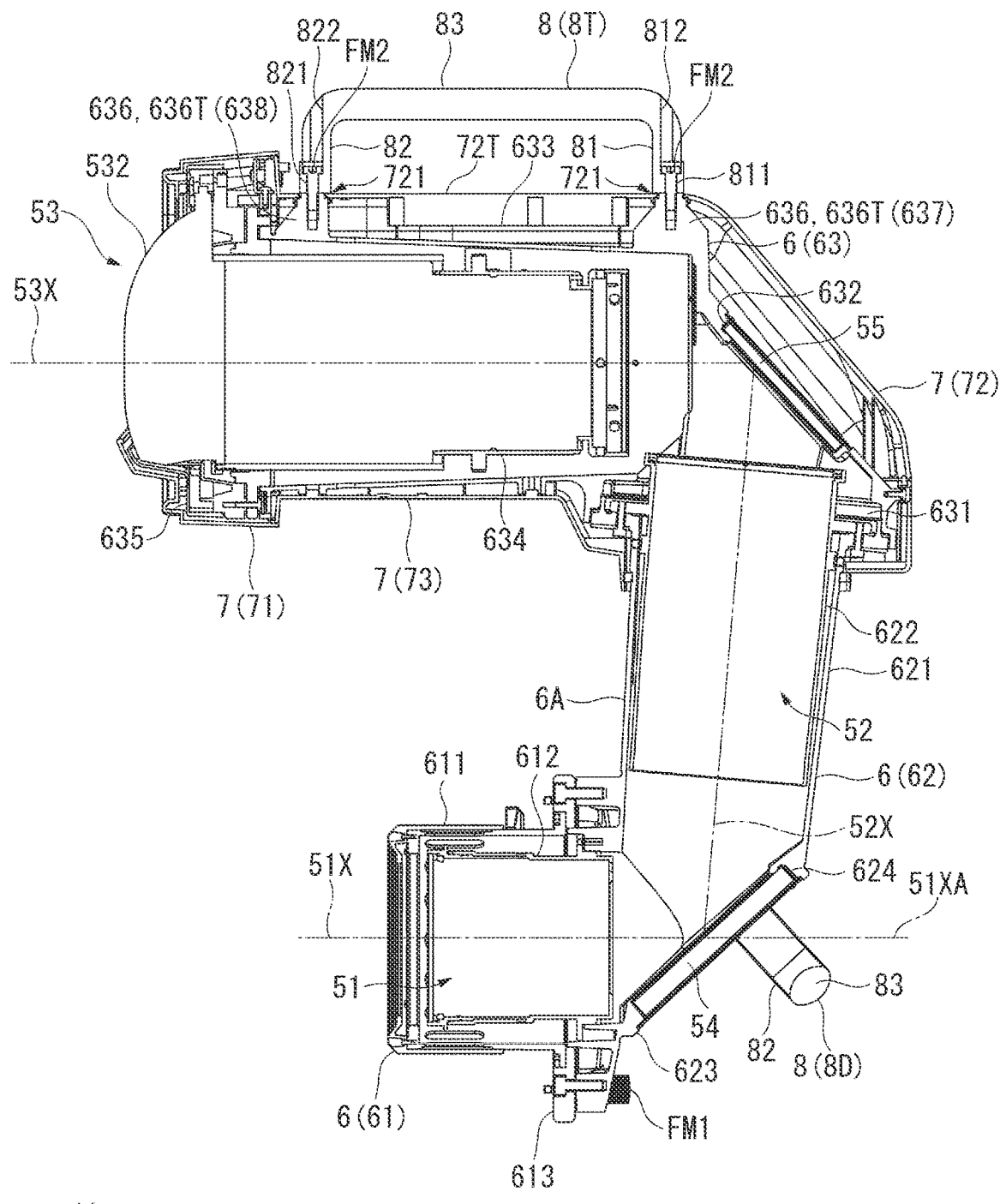
FIG. 3 is a cross-sectional view showing a projection optical apparatus according to the embodiment.

FIG. 2 is a side view of the projector 1 viewed from the side facing the left side surface 23. FIG. 3 is a cross-sectional view of the projection optical apparatus 5 taken along the plane YZ. In FIG. 3, out of lenses that form the projection optical apparatus 5, those excluding a projection lens 532 are omitted.

The projection optical apparatus 5 is used in the projector 1 and projects the image light. In detail, the projection optical apparatus 5 is removably installed in the light emitting apparatus 11. The projection optical apparatus 5 projects the image light incident from the light combiner 455 onto the projection receiving surface to display an image on the projection receiving surface. That is, the projection optical apparatus 5 projects the light incident from the light emitting apparatus 11 onto the projection surface. The projection optical apparatus 5 includes an optical system having a horizontally-oriented-U-letter-shaped optical path, deflects in two successive stages the direction of the image light outputted from the light combiner 455, and projects the image light onto the projection receiving surface located on the opposite side from the side toward which the light combiner 455 outputs the image light, as shown in FIGS. 2 and 3. That is, the projection optical apparatus 5 is configured to have a substantially U-letter-shape rotated by 90° counterclockwise when viewed from the positive side in the direction X.

The projection optical apparatus 5 includes a first lens group 51, a second lens group 52, a third lens group 53, a first reflector 54, and a second reflector 55. That is, the projection optical apparatus 5 includes a plurality of lenses. The first reflector 54 and the second reflector 55 are each, for example, a flat mirror.

Configurations of First Lens Group, First Reflector, and Second Lens Group

The first lens group 51 and the second lens group 52 are constituent elements or a first optical system and form an intermediate image.

The image light from the image generator 4 enters the first lens group 51, as shown in FIG. 2. That is, the light from the light emitting apparatus 11 enters the first lens group 51. The first lens group 51 includes at least one lens 511 disposed on an optical axis 51X of the first lens group 51, as shown in FIGS. 2 and 3. The optical axis 51X of the first lens group 51 corresponds to a first optical axis and extends along the direction +Z. The image light outputted from the image generator 4 passes through the first lens group 51 along the direction +Z and travels to the first reflector 54.

The first reflector 54 is disposed between the first lens group 51 and the second lens group 52. The first reflector 54 reflects the image light having passed through the first lens group 51 in such a way that the reflected image light travels in the direction +Y toward the second lens group 52. That is, the image light having passed through the first lens group 51 enters the second lens group 52 via the first reflector 54.

The image light reflected off the first reflector 54 passes through the second lens group 52. The second lens group 52 includes at least one lens 521 disposed on an optical axis 52X, which intersects with the optical axis 51X of the first lens group 51. The optical axis 52X of the second lens group 52 corresponds to a second optical axis and extends along the direction +Y. The image light reflected off the first reflector 54 passes through the second lens group 52 along the direction +Y and travels to the second reflector 55.

The first lens group 51 is disposed on a reduction side of the first reflector 54, and the second lens group 52 is disposed on an enlargement side of the first reflector 54, as described above.

Configurations of Second Reflector and Third Lens Group

The second reflector 55 is disposed between the second lens group 52 and the third lens group 53 and reflects in the direction −Z the image light having passed through the second lens group 52 and incident in the direction +Y on the second reflector 55 to cause the image light to enter the third lens group 53.

The third lens group 53 magnifies and projects the intermediate image. The third lens group 53 includes a lens 531 and the projection lens 532 disposed on an optical axis 53X, which intersects with the optical axis 52X of the second lens group 52. The optical axis 53X of the third lens group 53 corresponds to a third optical axis and extends along the direction −Z. The image light reflected off the second reflector 55 passes through the third lens group 53 along the direction −Z and is projected toward the projection receiving surface. In the present embodiment, the optical axis 53X intersects with the optical axis 52X and is parallel to the optical axis 51X, but not necessarily. The optical axis 53X may not necessarily be parallel to the optical axis 51X.

The lens 531 may include a focusing lens. The focusing lens is moved by a focus adjuster that is not shown in the direction +Z or −Z along the optical axis 53X. Focus adjustment is thus performed on an image displayed on the projection receiving surface. The configuration of the focus adjuster may, for example, include a motor controlled by the controller 3 and a wheel train mechanism including gears and other components, or the wheel train mechanism may be manually operated by a user.

The projection lens 532 is the largest lens in the third lens group 53 and is a lens that finally projects the image light onto the projection receiving surface located in a position outside the projection optical apparatus 5. That is, the projection lens 532 is the lens disposed in a position closest to the enlargement side out of the plurality of lenses provided in the projection optical apparatus 5, and the angle of view of the projection lens 532 is in the present embodiment 70° when viewed from the positive side in the direction X. The optical axis of the projection lens 532 coincides with the optical axis 53X.

The third lens group 53 only needs to include the projection lens 532 and does not need to include the lens 531, which differs from the projection lens 532.

The image light reflected off the second reflector 55 in the direction −Z is angularly widened by the third lens group 53 and travels in a direction that inclines in the direction +Y with respect to the optical axis 53X. Therefore, the projection optical apparatus 5 is capable of magnifying projection when located in a position close to the projection receiving surface, and the projector 1 in which the projection optical apparatus 5 is installed functions as a short-focal-length projector.

Other Configurations of Projection Optical Apparatus

Figure 4:
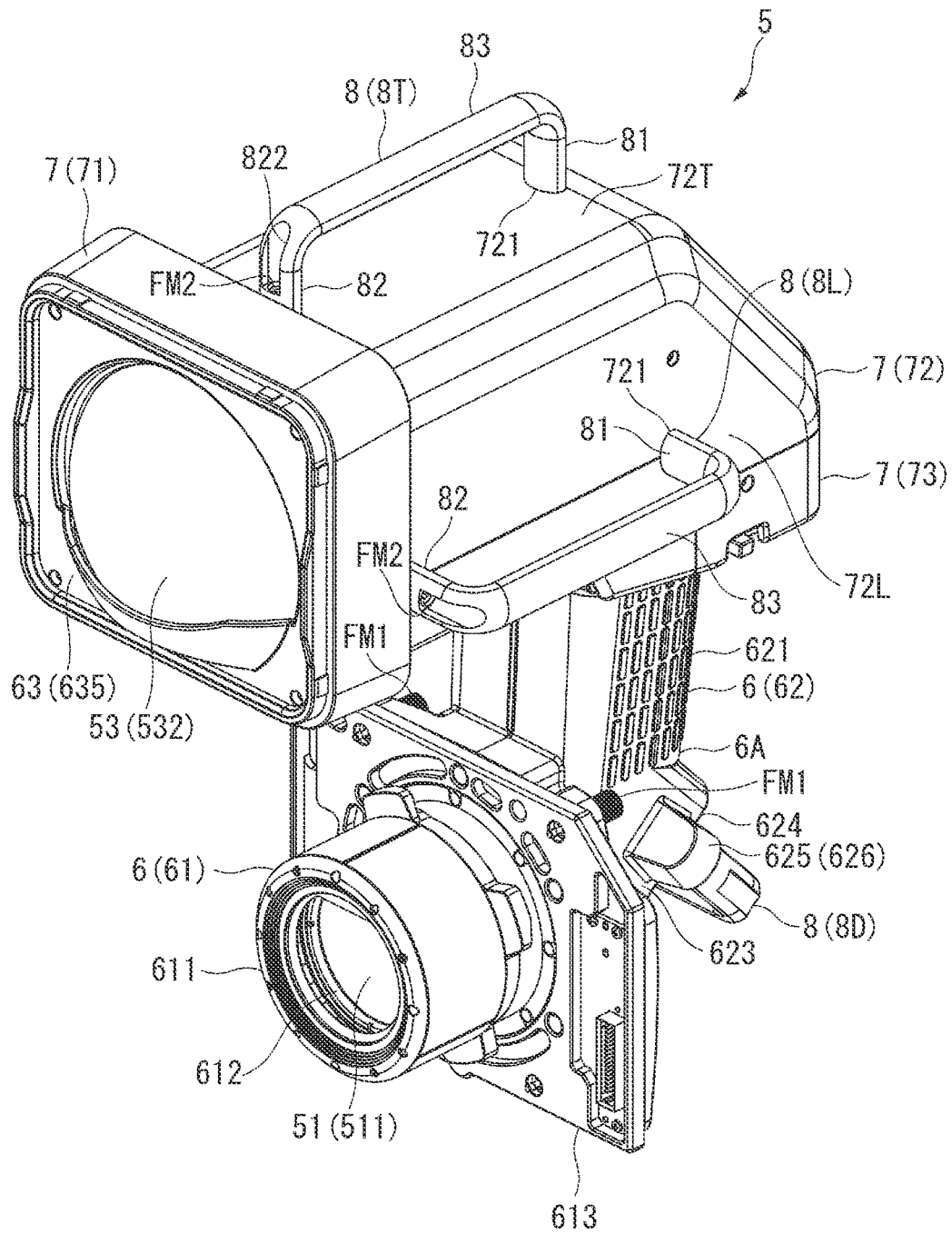
FIG. 4 is a perspective view showing the projection optical apparatus according to the embodiment.
Figure 5:
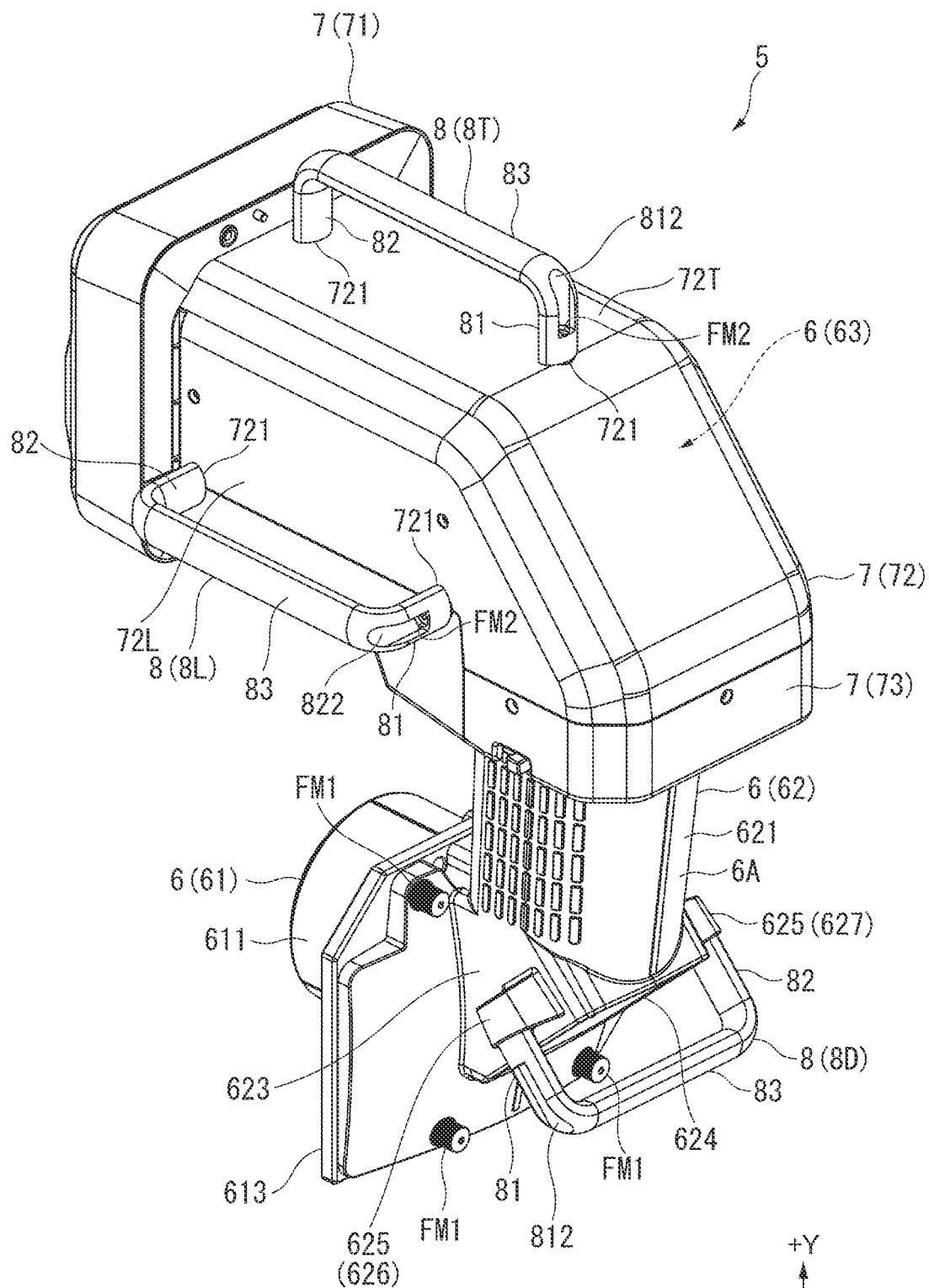
FIG. 5 is another perspective view showing the projection optical apparatus according to the embodiment.
Figure 6:
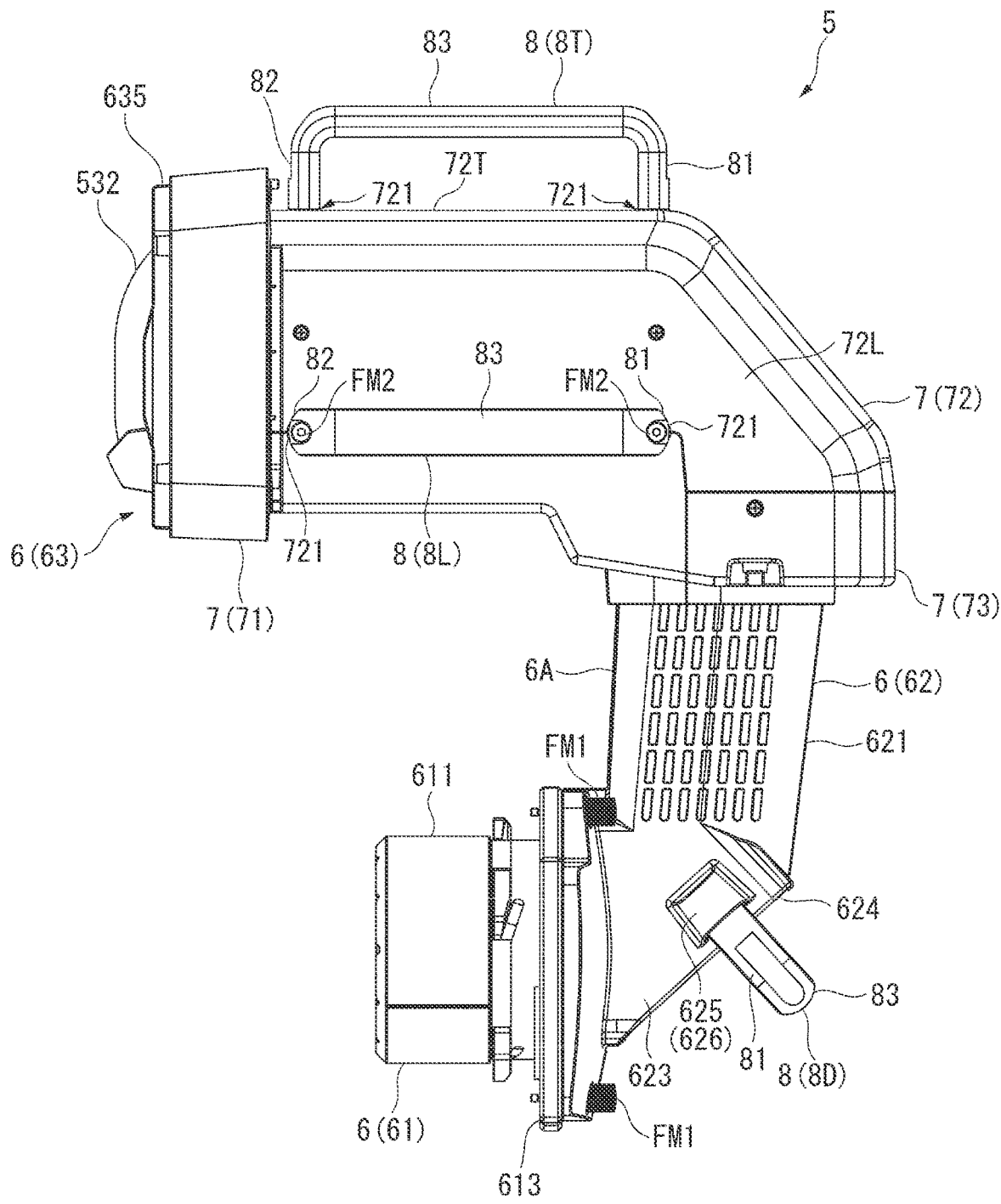
FIG. 6 is a side view showing the projection optical apparatus according to the embodiment.
Figure 7:
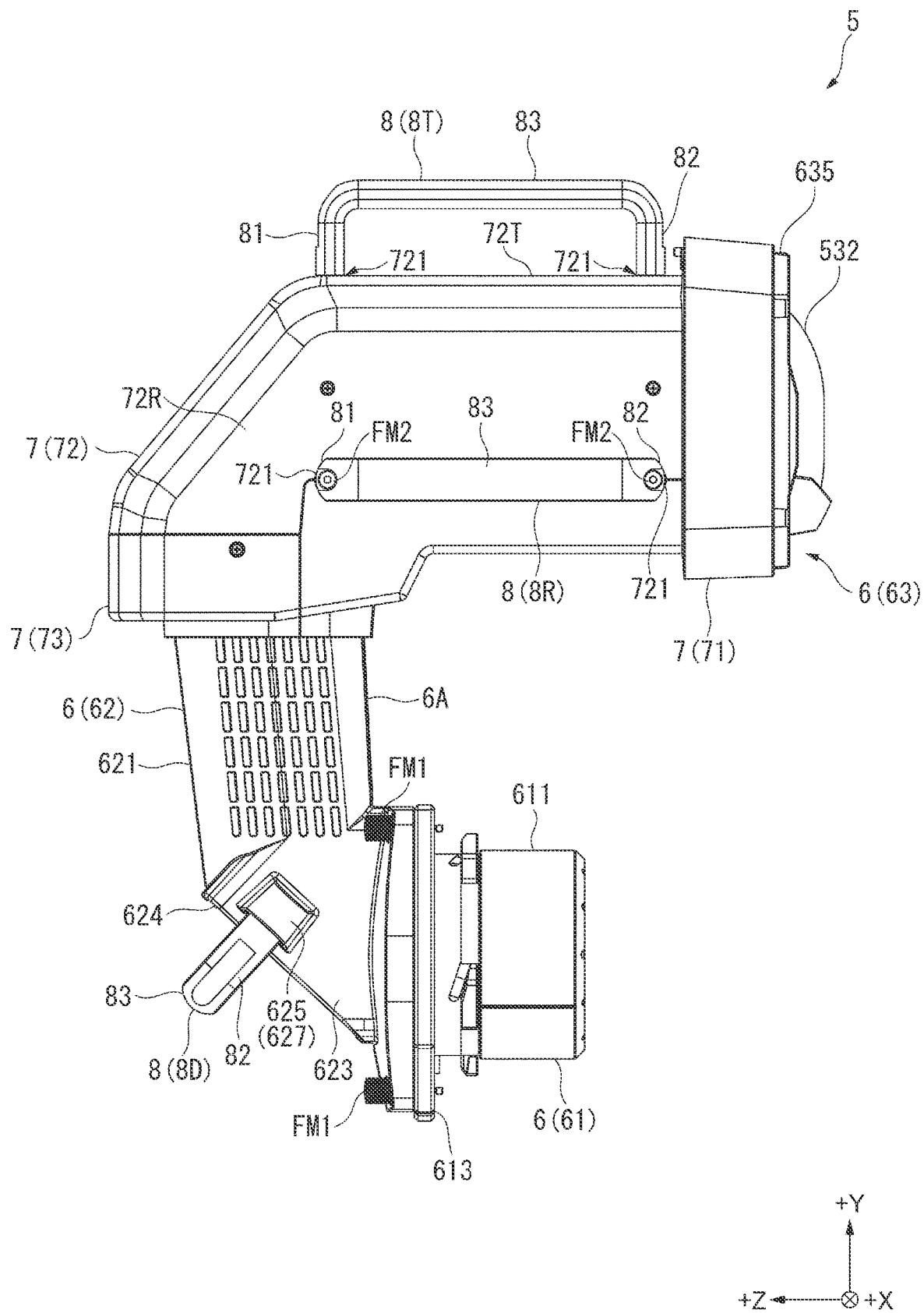
FIG. 7 is another side view showing the projection optical apparatus according to the embodiment.

FIG. 4 is a perspective view of the projection optical apparatus 5 viewed from the negative side in the direction Z, and FIG. 5 is a perspective view of the projection optical apparatus 5 viewed from the positive side in the direction Z. FIG. 6 is a side view of the projection optical apparatus 5 viewed from the positive side in the direction X, and FIG. 7 is a side view of the projection optical apparatus 5 viewed from the negative side in the direction X.

The projection optical apparatus 5 further includes a lens barrel 6, a cover member 7, and grips 8, as shown in FIGS. 3 to 7.

Configuration of Lens Barrel

The lens barrel 6 accommodates the first lens group 51, the second lens group 52, the third lens group 53, the first reflector 54, and the second reflector 55, as shown in FIG. 3. That is, the lens barrel 6 holds a plurality of lenses. The cover member 7 and the grips 8 are attached to the lens barrel 6. The lens barrel 6 includes a first holding member 61, a second holding member 62, and a third holding member 63.

Configuration of First Holding Member

The first holding member 61 holds the first lens group 51 and is detachably attached to the light emitting apparatus 11. The first holding member 61 includes a first tubular section 611, a first frame 612, and a flange 613.

The first tubular section 611 corresponds to a light incident section and forms a lens barrel main body 6A. The optical axis 51X is set in the first tubular section 611, and the light emitted from the light emitting apparatus 11 enters the first tubular section 611. That is, the light emitted from the light emitting apparatus 11 passes through the first tubular section 611 along the optical axis 51X. The first tubular section 611 is made of metal and has a cylindrical shape around the optical axis 51X.

The first frame 612 holds the first lens group 51. The first frame 612 is disposed in the first tubular section 611.

Figure 8:
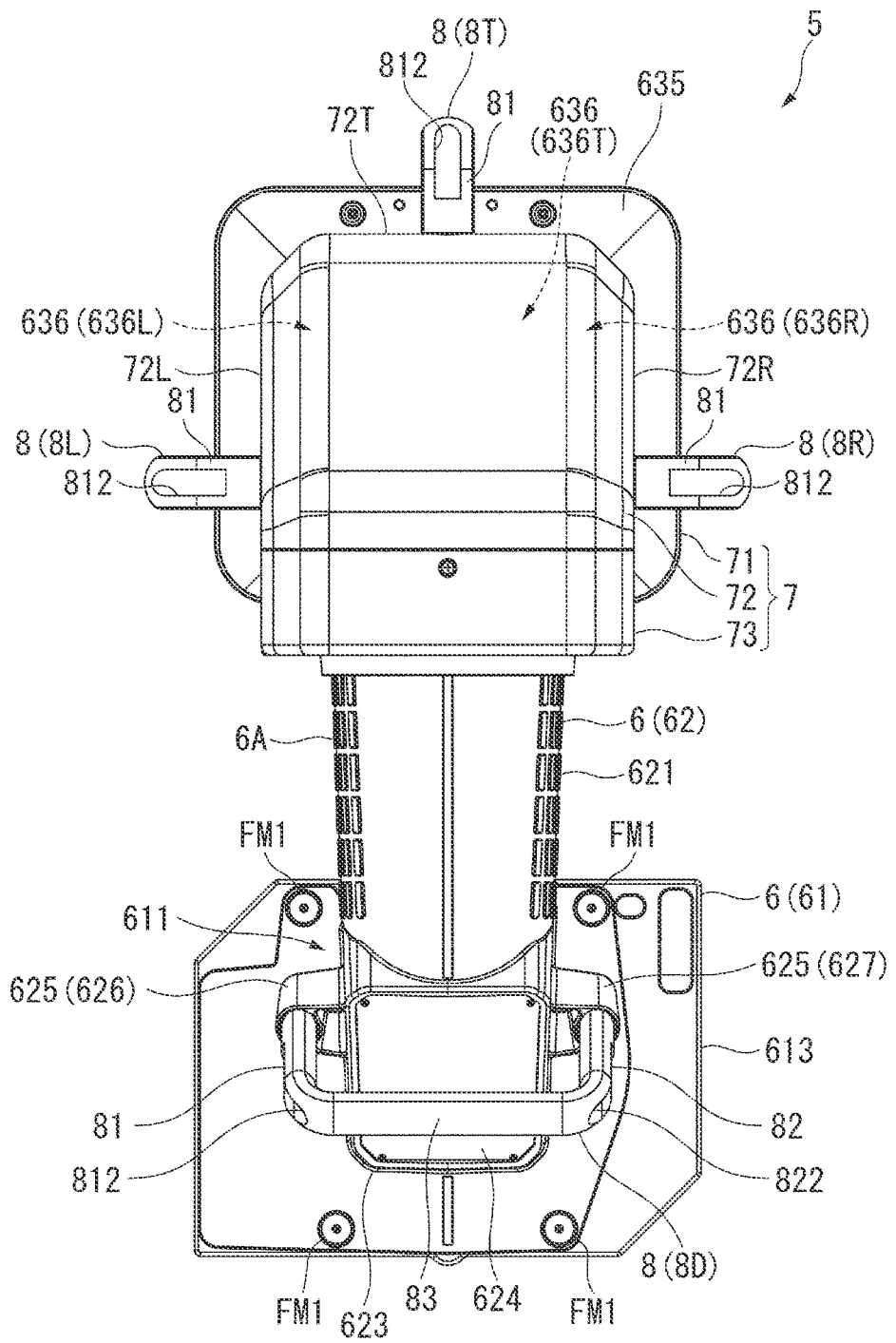
FIG. 8 is another side view showing the projection optical apparatus according to the embodiment.

FIG. 8 is a side view of the projection optical apparatus 5 viewed from the positive side in the direction Z.

The flange 613 protrudes outward from the first tubular section 611 in the radial direction thereof and has a substantially rectangular shape when viewed from the negative and positive sides in the direction Z, as shown in FIGS. 4 to 8. That is, the flange 613 protrudes outward from the lens barrel main body 6A, which will be described later. The flange 613 is coupled to the light emitting apparatus 11, whereby the projection optical apparatus 5 can be removably installed in the light emitting apparatus 11. In detail, the flange 613 includes a plurality of fixing members FM1, and the fixing members FM1 are fixed to fixing portions of the light emitting apparatus 11 that are not shown in the figures, so that the projection optical apparatus 5 is attached to the light emitting apparatus 11. The projection optical apparatus 5 is detached from the light emitting apparatus 11 by detaching the fixing members FM1. The size of the flange 613 viewed from the positive side in the direction Z is approximately equal to the size of a projection part 635, which will be described later, viewed from the same side, as shown in FIG. 6.

Configuration of Second Holding Member

The second holding member 62 holds the second lens group 52 and the first reflector 54 and is linked to the first holding member 61 and the third holding member 63, as shown in FIG. 3. The second holding member 62 includes a second tubular section 621, a second frame 622, a linkage section 623, and a first placement section 624.

The second tubular section 621 corresponds to an intermediate section. The optical axis 52X is set in the second tubular section 621, and the light having passed through the first tubular section 611 and having been reflected off the first reflector 54 passes through the second tubular section 621 along the optical axis 52X. That is, the light having exited out of the first tubular section 611 and having been reflected off the first reflector 54 passes through the second tubular section 621 along the optical axis 52X, which intersects with the optical axis 51X. The second tubular section 621 is made of metal and has a cylindrical shape around the optical axis 52X.

The second frame 622 holds the second lens group 52. The second frame 622 is fixed in the second tubular section 621.

The linkage section 623 links the second tubular section 621 to the first tubular section 611. The linkage section 623 is made of metal and has a tubular shape that allows light passage therethrough.

The first placement section 624 is provided in the linkage section 623. The first reflector 54 is disposed in the first placement section 624.

The second holding member 62 further includes an attachment part 625, to which one of the grips 8 (8D), which will be described later, is removably attached, as shown in FIGS. 5 to 8.

The attachment part 625 is provided at the outer surface of the linkage section 623. The attachment part 625 is provided at a portion of the linkage section 623 that is the portion corresponding to the first placement section 624, where the first reflector 54 is disposed, when viewed from the positive side in the direction Z, as shown in FIG. 6. That is, the grip 8D, which is attached to the attachment part 625, is attached to a portion of the lens barrel 6 that is the portion corresponding to the first reflector 54. The grip 8D, which will be described later, corresponds to a first or second grip.

The attachment part 625 includes fixing sections 626 and 627, which sandwich the first placement section 624 in the direction +X. The fixing section 626 is disposed on the positive side in the direction X, and the fixing section 627 is disposed on the negative side in the direction X. The fixing sections 626 and 627 are portions where fixing members which are not shown but through which the grip 8D is inserted are fixed, and the fixing sections 626 and 627 have, in the present embodiment, screw holes with which screws as the fixing members engage.

As described above, the attachment part 625, to which the grip 8D is attached, and the linkage section 623, at which the attachment part 625 is provided, are made of metal.

Configuration of Third Holding Member

The third holding member 63 holds the third lens group 53 and the second reflector 55 and also supports the three grips 8 (8T, 8L, and 8R). The third holding member 63 is linked to the second holding member 62.

The third holding member 63 includes a linkage section 631, a second placement section 632, a third tubular section 633, a third frame 634, the projection part 635, and attachment parts 636, as shown in FIG. 3.

The linkage section 631 is provided at the third holding member 63 in a position shifted in the directions +Z, and −Y. The linkage section 631 links the third holding member 63 to the second holding member 62.

The second placement section 632 is provided in the third holding member 63, specifically, at an inclining portion that intersects with the optical axis 52X. The second reflector 55 is disposed in the second placement section 632.

The third tubular section 633 corresponds to a light exiting section and is provided substantially at the center of the third holding member 63 in the direction +Z. The optical axis 53X is set in the third tubular section 633. The third tubular section 633 guides the image light having passed through the second tubular section 621 and having been reflected off the second reflector 55 to the projection part 635 along the optical axis 53X. That is, the light having exited out of the second tubular section 621 and having been reflected off the second reflector 55 passes through the third tubular section 633 along the optical axis 53X, which intersects with the optical axis 52X. The third tubular section 633 is made of metal and has a tubular shape around the optical axis 53X.

The third frame 634 holds the lens 531 out of the lenses that form the third lens group 53 excluding the projection lens 532, which is held by the projection part 635. The third frame 634 is fixed in the third tubular section 633.

The third tubular section 633 is integrated with the linkage section 631, and the third tubular section 633 and the linkage section 631 are made of metal. The second tubular section 621, which is linked to the third tubular section 633 via the linkage section 631, and the linkage section 623 are made of metal. Furthermore, the first tubular section 611, which is linked to the second tubular section 621 via the linkage section 623, is also made of metal. The first tubular section 611, the linkage section 623, the second tubular section 621, the linkage section 631, and the third tubular section 633, which are linked to each other, thus form the lens barrel main body 6A made of metal. That is, the lens barrel 6 includes the lens barrel main body 6A.

The projection part 635 is provided on one side of the third tubular section 633, the side facing in the direction in which the image light having passed through the third tubular section 633 travels. The optical axis 53X is set in the projection part 635, and the projection part 635 projects the image light having passed through the third tubular section 633 out of the projector 1.

The projection part 635 extends radially outward from the third tubular section 633 and holds the projection lens 532, as shown in FIGS. 3 and 4. That is, the projection part 635 protrudes outward from the lens barrel main body 6A and holds the projection lens 532.

The projection lens 532, which is the downstream lens in the projection optical apparatus 5 that is the lens via which the image light exits, is the largest lens in the third lens group 53, which magnifies the image light, and is also the largest lens of the lenses provided in the projection optical apparatus 5. To hold the sized projection lens 532, the projection part 635 protrudes in the directions ±X and ±Y with respect to the third tubular section 633 and therefore has a diameter greater than that of the third tubular section 633. That is, the projection part 635, which holds the projection lens 532, extends outward from the third tubular section 633.

The attachment parts 636 are portions of the third tubular section 633 that are the portions to which the grips 8T, 8L, and 8R are attached. In the present embodiment, three attachment parts 636 are provided at the third tubular section 633, as shown in FIG. 8. The three attachment parts 636 include an attachment part 636T, to which the grip 8T is attached, an attachment part 636L, to which the grip 8L is attached, and an attachment part 636R, to which the grip 8R is attached. The grips 8T, 8L, and 8R, which will be described later, correspond to the first grip. The attachment parts 636T, 636L, and 636R, to which the grips 8T, 8L, 8R are attached, respectively, and the third tubular section 633, which includes the attachment parts 636T, 636L, 636R, are made of metal, as described above.

The attachment part 636T is provided at a surface of the third tubular section 633 that is the surface facing in the direction +Y, as shown in FIG. 3. The attachment part 636T includes two fixing sections 637 and 638. The fixing sections 637 and 638 are separate from each other in the direction +Z. The fixing section 637 is shifted in the direction +Z from the fixing section 638.

The fixing sections 637 and 638 are portions to which fixing members FM2 are fixed along the direction +Y. In the present embodiment, the fixing section 637 has a hole to which a fixing member FM2 inserted through an arm 81 of the grip 8T is fixed. Similarly, the fixing section 638 has a hole to which a fixing member FM2 inserted through an arm 82 of the grip 81 is fixed. The holes formed in the fixing sections 637 and 638 are screw holes in the present embodiment, and the fixing members FM2 are screws.

The attachment part 636L, is provided at a surface of the third tubular section 633 that is the surface facing in the direction +X, although not shown in detail. The attachment part 636R is provided at a surface of the third tubular section 633 that is the surface facing in the direction −X. The attachment parts 636L and 636R include fixing sections 637 and 638, which are the same as those of the attachment part 636T.

Configuration of Cover Member

The cover member 7 covers the portion where the second holding member 62 and the third holding member 63 are linked to each other and further covers the third holding member 63, as shown in FIGS. 4 to 8. That is, the cover member 7 covers part of the lens barrel 6 and forms part of the exterior of the projection optical apparatus 5. The cover member 7 includes a first cover 71, a second cover 72, and a third cover 73 and is configured as the combination of the first cover 71, the second cover 72, and the third cover 73.

The first cover 71 has the form of a frame that surrounds the outer circumference of the projection part 635.

The second cover 72 is coupled to the first cover 71 and covers the third holding member 63 on the positive side in the direction Y. Specifically, the second cover 72 covers the second placement section 632 and the third tubular section 633 on the positive side in the direction Y and the positive and negative sides in the direction X. An end portion of the second cover 72 that is the portion facing in the directions +Y and +Z incline in accordance with the shape of the second placement section 632 so as to be shifted in the direction −Z with distance in the direction +Y.

The second cover 72 has a plurality of holes 721, through which the arms 81 and 82 of the grips 8T, 8L, and 8R are inserted, as shown in FIGS. 4 to 7. Specifically, two holes 721 are provided in each surface of the second cover 72, a surface 72T facing in the direction +Y, a surface 72L facing in the direction +X, and a surface 72R facing in the direction −X.

The third cover 73 is coupled to the second cover 72 and covers the third holding member 63 on the negative side in the direction Y. Specifically, the third cover 73 covers the linkage section 631, the second placement section 632, and the third tubular section 633 on the negative side in the direction Y and the positive and negative sides in the direction X. That is, part of the third cover 73 covers the portion where the second holding member 62 and the third holding member 63 are linked to each other on the negative side in the direction Y. The configuration described above prevents the member that links the second holding member 62 and the third holding member 63 to each other from being exposed to the environment outside the projection optical apparatus 5.

Configuration of Grips

The plurality of grips 8 each extend outward from the lens barrel 6 and is gripped by the user. The plurality of grips 8 include the grips 8T, 8L, and 8R, which are attached to the attachment parts 636 of the third tubular section 633, and the grip 8D, which is attached to the attachment part 625 of the linkage section 623. The grips 8T, 8L, and 8R extend outward from the third tubular section 633 of the third holding member 63. The grip 8D extends outward from the linkage section 623 of the second holding member 62.

The grips 8T, 8L, 8R, and 8D each include the arms 81 and 82, and a coupling section 83, which couples the arms 81 and 82 to each other, and are each formed in a substantially U-letter shape.

The arms 81 each have a hole 811, through which a fixing member FM2 is inserted, and a guide groove 812, which guides the fixing member FM2 into the hole 811. The hole 811 and the guide groove 812 are located in an end portion of the arm 81 that is the portion opposite from the coupling section 83. The arm 82 has the same configuration as that of the arm 81. That is, the arm 82 has a hole 821 and a guide groove 822, which are the same as the hole 811 and the guide groove 812.

The coupling section 83 has a cylindrical columnar shape and is the portion gripped by the user.

The carps 8T, 8L, and 8R correspond to the first grip and are attached to the third tubular section 633, which corresponds to the light exiting section in the lens barrel 6.

The arm 81 of the grip 8T is fixed to the fixing section 637 of the attachment part 636T with a fixing member FM2 inserted through the hole 811, and the arm 82 is fixed to the fixing section 638 of the attachment part 636T with a fixing member FM2 inserted through the hole 821, as shown in FIG. 3. Specifically, the arms 81 and 82 are inserted through the two holes 721 provided in the surface 72T of the second cover 72, as shown in FIGS. 3 to 7. That is, the grip 8T is inserted through the second cover 72 of the cover member 7 and attached to the lens barrel 6. The grip 8T attached to the attachment part 636T therefore extends in the direction +Y or outward beyond the second cover 72, and the coupling section 83 of the grip 8T is disposed outside the cover member 7, as shown in FIGS. 3 to 8.

In the configuration described above, the grip 8T extends in the direction +Y or outward beyond the projection part 635, and the coupling section 83 of the grip 8T is shifted in the direction +Y from the projection part 635, as shown in FIGS. 3, 6 to 8. In other words, the grip 8T extends in the direction +Y or outward beyond the first cover 71, and the coupling section 83 of the grip 8T is shifted in the direction +Y from the first cover 71.

Figure 9:
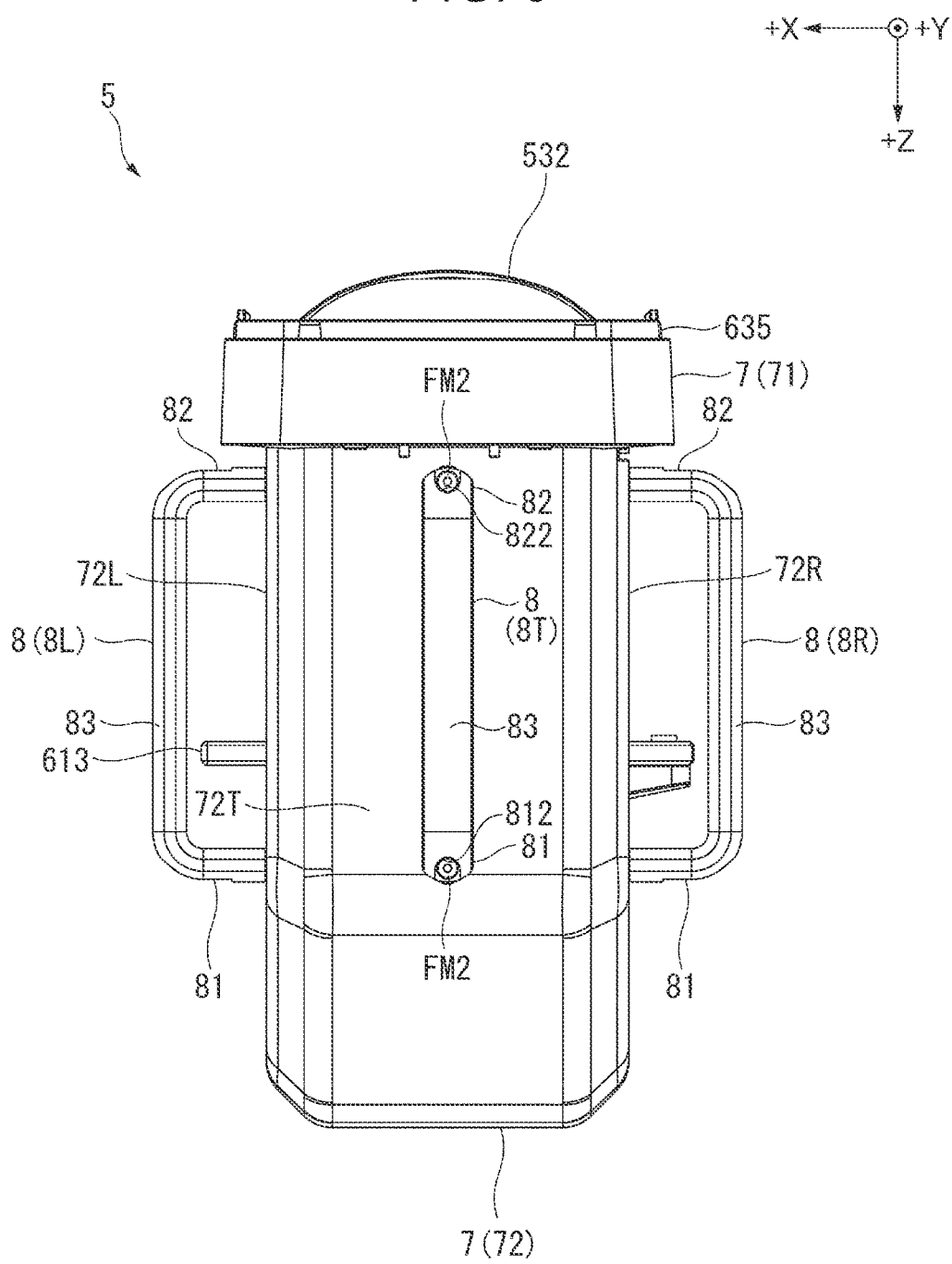
FIG. 9 is a plan view showing the projection optical apparatus according to the embodiment.

FIG. 9 is a plan view of the projection optical apparatus 5 viewed from the positive side in the direction Y.

The grip 8L is attached to the attachment part 636L and extends beyond the second cover 72 in the direction +X or outward beyond the second cover 72, as shown in FIG. 9. Furthermore, the grip 8L is inserted through the cover member 7 and attached to the lens barrel 6. In this configuration, the coupling section 83 of the grip 8L is disposed outside the cover member 7. In detail, the grip 8L extends in the direction +X or outward beyond the projection part 635, and the coupling section 83 of the grip 8L is shifted in the direction +X from the projection part 635. In other words, the grip 8L extends in the direction +X or outward beyond the first cover 71, and the coupling section 83 of the grip 8L is shifted in the direction +X from the first cover 71.

Similarly, the grip 8R is attached to the attachment part 636R and extends in the direction −X beyond the second cover 72 or outward beyond the second cover 72. Furthermore, the grip 8R is inserted through the cover member 7 and attached to the lens barrel 6. In this configuration, the coupling section 83 of the grip 8R is disposed outside the cover member 7. In detail, the grip 8R extends in the direction −X or outward beyond the projection part 635, and the coupling section 83 of the grip 8R is shifted in the direction −X from the projection part 635. In other words, the grip 8R extends in the direction −X or outward beyond the first cover 71, and the coupling section 83 of the grip 8R is shifted in the direction −X from the first cover 71.

The grip 8D shown in FIGS. 5 to 8 corresponds to the first or second grip. The arm 81 of the grip 8D is fixed to the fixing section 626 of the attachment part 625 by a fixing member FM2, as shown in FIGS. 5, 6, and 8. The arm 82 of the grip 8D is fixed to the fixing section 627 of the attachment part 625 by a fixing member FM2, as shown in FIGS. 5, 7, and 8. The arms 81 and 82 thus extend in a direction substantially perpendicular to the reflection surface of the first reflector 54 provided at the first placement 624. The grip 8D is attached to a portion of the lens barrel 6 that is the portion corresponding to the first reflector 54. In detail, the grip 8D is attached to the attachment part 625 located at a portion of the second holding member 62 that is the portion corresponding to the first reflector 54 and extends in the directions −Y and +Z from the linkage section 623 of the second holding member 62.

When attached to the attachment part 625, the grip 8D is so located that an extension 51XA of the optical axis 51X passes through the grip 8D, as shown in FIG. 3. In other words, viewed from the side facing the positive side in the direction X, the arms 81 and 82 of the grip 8D intersect with the extension 51XA of the optical axis 51X. Therefore, when the user who grips the grip 8D attaches the projection optical apparatus 5 to the light emitting apparatus 11, the optical axis 51X can be easily aligned with the optical axis of the light emitted by the light emitting apparatus 11, whereby the projection optical apparatus 5 can be readily attached to the light emitting apparatus 11.

As described above, the grips 8T, 8L, 8R, and 8D can be detached from the lens barrel 6 by detaching the fixing members FM2. That is, the grips 8T, 8L, 8R, and 8D are removably attached to the lens barrel 6.

Effects of Present Embodiment

The projector 1 according to the present embodiment described above provides the following effects.

The projector 1 includes the light outputting apparatus 11 and the projection optical apparatus 5. The light emitting apparatus 11 includes the light source 41 and the light modulators 453, which modulate the light emitted from the light source 41.

The projection optical apparatus 5 is removably installed in the light emitting apparatus 11 and projects the light incident from the light emitting apparatus 11. The projection optical apparatus 5 includes a plurality of lenses including the lenses 511, 521, and 531 and the projection lens 532, the lens barrel 6, and the grips 8.

The lens barrel 6 holds the plurality of lenses. The grips 8 are gripped by the user and each extend outward from the exterior of the lens barrel 6.

According to the configuration described above, the user can readily grip the projection optical apparatus 5 by griping the grips 8. The user can therefore readily transport the projection optical apparatus 5, install the projection optical apparatus 5 in the light emitting apparatus 11, and detach the projection optical apparatus 5 from the light emitting apparatus 11.

In the projection optical apparatus 5, the plurality of lenses provided in the projection optical apparatus 5 includes the projection lens 532, which is disposed in a position closest to the enlargement side. The lens barrel 6 includes the lens barrel main body 6A, and the projection part 635, which extends outward from the lens barrel main body 6A and holds the projection lens 532. Out of the grips 8, the grips 8T, 8L, and 8R extend outward beyond the projection part 635.

According to the configuration described above, when the projection optical apparatus 5 is placed on a floor or caused to stand against a wall, one of the grips 8T, 8L, and 8R can be readily brought into contact with the floor or the wall before the projection part 635 is. The configuration described above prevents a load from acting on the projection lens 532 held in the projection part 635. Even when some kind of impact acts on the projection optical apparatus 5, the impact acts on one of the grips 8T, 8L, and 8R before acting on the projection part 635, whereby damage of the projection lens 532 held in the projection part 635 and in turn damage of the projection optical apparatus 5 can be avoided.

In the projection optical apparatus 5, the lens barrel 6 includes the flange 613, which protrudes outward from the lens barrel main body 6A and is coupled to the light emitting apparatus 11.

The configuration described above allows the projection optical apparatus 5 to be readily installed in the light emitting apparatus 11. Since the flange 613 protrudes outward from the lens barrel main body 6A, when the projection optical apparatus 5 falls on a floor, the flange 613 comes into contact with the floor before the lens barrel main body 6A does, whereby the projection optical apparatus 5 can be protected.

The projection optical apparatus 5 includes the cover member 7, which covers part of the lens barrel 6. Out of the grips 8, the grips 8T, 8L, and 8R are inserted through the cover member 7 and attached to the lens barrel 6.

According to the configuration described above, disengagement of the grip 8T, 8L, or 8R can be avoided as compared with a case in which the grips 8T, 8L, and 8R are attached to the cover member 7. Therefore, even when the projection optical apparatus 5 is heavy, disengagement of the grip 8T, 8L, or 8R due to the weight of the projection optical apparatus 5 can be avoided. Furthermore, the attachment parts 636T, 636L, and 636R, to which the grips 8T, 8L, and 8R are attached, are covered with the cover member 7 in the lens barrel 6, whereby the exterior appearance of the projection optical apparatus 5 can be improved.

In the projection optical apparatus 5, the grips 8 are removably attached to the lens barrel 6.

According to the configuration described above, after the projection optical apparatus 5 is attached to the light emitting apparatus 11, the grips 8 can be detached from the lens barrel 6. The exterior appearance of the projection optical apparatus 5 and in turn the exterior appearance of the projector 1 with the projection optical apparatus 5 installed in the light emitting apparatus 11 can be improved.

In the projection optical apparatus 5, the lens barrel 6 includes the attachment parts 625 and 636, to which the grips 8 are attached. The attachment parts 625 and 636 are made of metal. Specifically, the third tubular section 633, which is provided with the attachment parts 636T, 636L, and 636R, to which the grips 8T, 8L, and 8R are attached, is made of metal. The attachment part 625, to which the grip 8D is attached, and the linkage section 623, at which the attachment part 625 is provided, are made of metal.

According to the configuration described above, the lens barrel 6 can be robustly configured. Disengagement of the grips 8 from the lens barrel 6 can thus be avoided, and the user who grips the grips 8 can stably grip the projection optical apparatus 5. Even when the projection optical apparatus 5 falls or is otherwise handled so that an impact acts thereon, distortion of the lens barrel 6 can be avoided.

The projection optical apparatus 5 includes the first reflector 54 and the second reflector 55. The lens barrel 6 includes the first holding member 61, the second holding member 62, and the third holding member 63.

The first holding member 61 includes the first tubular section 611, through which the light emitted from the light emitting apparatus 11 passes along the optical axis 51X. The first tubular section 611 corresponds to the light incident section, and the optical axis 51X corresponds to the first optical axis.

The second holding member 62 includes the second tubular section 621, through which the light having exited out of the first tubular section 611 and having been reflected off the first reflector 54 passes along the optical axis 52X, which intersects with the optical axis 51X. The second tubular section 621 corresponds to the intermediate section, and the optical axis 52X corresponds to the second optical axis.

The third holding member 63 includes the third tubular section 633, through which the light having exited out of the second tubular section 621 and having been reflected off the second reflector 55 passes along the optical axis 53X, which intersects with the optical axis 52X. The third tubular section 633 corresponds to the light exiting section, and the optical axis 53X corresponds to the third optical axis.

According to the configuration described above, the image light having entered the projection optical apparatus 5 can be emitted in the direction opposite to the direction in which the light enters the projection optical apparatus 5 via a position shifted from the first tubular section 611 in the direction in which the light passing through the second tubular section 621 travels, that is, a position shifted from the first tubular section 611 in the direction +Y.

In the projection optical apparatus 5, the grips 8 include the grips 8T, 8L, 8R, and 8D. The grips 8T, 8L, and 8R are attached to the attachment parts 636 of the third tubular section 633, which is the light exiting section. The grip 8D is attached to the attachment part 625, which is located at a portion of the lens barrel 6 that is the portion corresponding to the first reflector 54.

According to the configuration described above, the grips 8T, 8L, and 8R and the grip 8D are disposed at one end and the other end in the direction in which the image light passing through the second tubular section 621 travels, respectively. That is, the grips 8T, 8L, and 8R and the grip 8D are disposed at one end and the other end of the projection optical apparatus 5 in the direction +Y. In other words, the grips 8T, 8L, and 8R and the grip 8D are disposed on opposite sides of the second tubular section 621. The user can therefore stably hold the projection optical apparatus 5 by gripping at least one of the grips 8T, 8L, and 8R and the grip 8D.

Instead, a first user can grip at least one of the grips 8T, 8L, and 8R, and a second user can grip the grip 8D. In this case, multiple persons can readily grip the projection optical apparatus 5.

In the projection optical apparatus 5, the grip 8D is so provided that the extension 51XA of the optical axis 51X passes the grip 8D. The optical axis 51X corresponds to the first optical axis.

According to the configuration described above, when the projection optical apparatus 5 is installed in the light emitting apparatus 11, the user can readily install the projection optical apparatus 5 in the light emitting apparatus 11 by gripping the grip 8D to align the optical axis 51X with the optical axis of the image light. Similarly, the projection optical apparatus 5 can be readily detached from the light emitting apparatus 11. The projection optical apparatus 5 can therefore be readily installed in and removed from the light emitting apparatus 11.

Variations of Embodiment

The present disclosure is not limited to the embodiment described above, and variations, improvements, and other modifications to the extent that the advantage of the present disclosure is achieved fall within the scope of the present disclosure.

In the embodiment described above, the projection optical apparatus 5 includes the grips 8T, 8L, 8R, and 8D, but not necessarily. The projection optical apparatus 5 only needs to include at least one grip 8, and the number of grips 8 with which the projection optical apparatus 5 is provided and the arrangement of the grips 8 can be changed as appropriate. The grips 8 each include the arms 81 and 82 and the coupling section 83 and are each formed in a substantially U-letter-shape, but not necessarily. For example, other shapes, such as a substantially H-letter-shape can be employed as the shape of the grips 8.

In the embodiment described above, the grips 8T, 8L, and 8R extend outward beyond the projecting section 635, which protrudes outward from the lens barrel main body 6A. That is, the grips 8T, 8L, and 8R extend radially outward beyond the projection part 635, but not necessarily. The grips in the present disclosure may not extend outward beyond the projection part 635. Furthermore, the projection part 635 may not protrude outward from the lens barrel main body 6A.

In the embodiment described above, the projection optical apparatus 5 includes the flange 613, which protrudes outward from the lens barrel main body 6A and is coupled to the light emitting apparatus 11. That is, the projection optical apparatus 5 includes the flange 613, which protrudes radially outward from the first tubular section 611, which forms the lens barrel main body 6A, but not necessarily. The flange 613 may be omitted. Furthermore, in the projection optical apparatus 5, the configuration coupled to the light emitting apparatus 11 may be any other configuration.

In the embodiment described above, the rips 8T, 8L, and 8R are inserted through the cover member 7, which covers the lens barrel 6, and attached to the attachment parts 636 provided at the third tubular section 633 of the lens barrel 6, but not necessarily. The cover member 7 may be omitted. The grips in the present disclosure may be attached to the lens barrel main body, which is made of metal, so as not to interfere with the cover member that covers the lens barrel. Furthermore, the grips in the present disclosure may be provided at the lens barrel, covered when the cover member is attached to the lens barrel, and exposed when the cover member is detached from the lens barrel.

In the embodiment described above, the grips 8T, 8L, 8R, and 8D are removably attached to the lens barrel 6, but not necessarily. The grips 8T, 8L, 8R, and 8D may be fixed to the lens barrel 6 or may be integrated with the lens barrel 6 or the lens barrel main body 6A. The attachment or fixation of the grips 8T, 8L, 8R, and 8D to the lens barrel 6 is not necessarily achieved by using the fixing members FM2, such as screws. For example, the grips 8T, 8L, 8R, and 8D may be welded to the lens barrel 6 or bonded thereto with an adhesive.

In the embodiment described above, in the optical tube 6, the third tubular section 633, to which the grips 8T, 8L, and 8R are attached, and the linkage section 623, to which the grip 8D is attached, are made of metal, but not necessarily. A portion of the lens barrel that is the portion to which the grips are attached may be made of a nonmetal material. Furthermore, the lens barrel 6 is not necessarily entirely made of metal.

In the embodiment described above, the projection optical apparatus 5 includes the first reflector 54 and the second reflector 55, and the lens barrel 6 includes the first tubular section 611 as the light incident section, the second tubular section 621 as the intermediate section, the third tubular section 633 as the light exiting section, and the projection part 635. That is, the projection optical apparatus 5 is configured to have a substantially U-letter-shape rotated by 90° counterclockwise when viewed from the positive side in the direction X, but not necessarily. The projection optical apparatus according to the present disclosure may instead include an optical system with the optical axis of the projection optical apparatus not being deflected but the optical axis of the projection optical apparatus linearly extending. That is, the optical system of the projection optical apparatus according to the present disclosure does not necessarily have the configuration shown in the embodiment described above.

In the embodiment described above, the grips 8 include the grips 8T, 8L, 8R, and 8D. The grips 8T, 8L, and 8R are attached to the third tubular section 633, which is the light exiting section, in the lens barrel 6, and the grip 8D is attached to a portion of the lens barrel 6 that is the portion corresponding to the first reflector 54, but not necessarily. The grips 8 may be attached to the second tubular section 621, which corresponds to the intermediate section. The arms 81 and 82 of each of the grips 8 may be attached to the flange 613.

At least one of the grips 8T, 8L, 8R, and 8D may be omitted. That is, the number of grips and the positions thereof can be changed as appropriate, as described above.

In the embodiment described above, the grip 8D is so provided that the extension 51XA of the optical axis 51X as the first optical axis passes through the grip 8D, but not necessarily. The grip 8D may not be so provided that the extension 51XA passes therethrough. The grip may be disposed in the vicinity of the extension 51XA when viewed from the positive side in the direction X.

In the embodiment described above, the projector 1 includes the three light modulators 453B, 453G, and 453R, but not necessarily. The present disclosure is also applicable to a projector including two or less or four or more light modulators.

In the embodiment described above, the optical components in the image generator 4 are arranged in the layout shown in FIG. 1, but not necessarily. The optical components in the image generator 4 may be arranged in other layouts, or the image generator 4 may include optical components other than those shown in FIG. 1.

In the embodiment described above, the light modulators 453 are each a transmissive liquid crystal panel having a light incident surface and a light exiting surface different from each other, but not necessarily. The light modulators 453 may each be a reflective liquid crystal panel having a surface that serves both as the light incident surface and the light exiting surface. Furthermore, a light modulator using any component other than a liquid-crystal-based component and capable of modulating an incident luminous flux to form an image according to image information, such as a device using micromirrors, for example, a digital micromirror device (DMD), may be employed.

In the embodiment described above, the projection optical apparatus 5 is removably installed in the light emitting apparatus 11, which forms the projector 1 and emits the image light, but not necessarily. The light emitting apparatus in which the projection optical apparatus according to the present disclosure is installed only needs to emit light that enters the projection optical apparatus and may not necessarily emit image light.

Overview of Present Disclosure

The present disclosure will be summarized below as additional remarks.

A projection optical apparatus according to a first aspect of the present disclosure is a projection optical apparatus that is removably installed in a light emitting apparatus and projects light incident from the light emitting apparatus, and the projection optical apparatus includes a plurality of lenses, a lens barrel that holds the plurality of lenses, and a first grip extending outward from the exterior of the lens barrel.

According to the configuration described above, the user can readily grip the projection optical apparatus by gripping the first grip. The user can therefore readily transport the projection optical apparatus, install the projection optical apparatus in the light emitting apparatus, and detach the projection optical apparatus from the light emitting apparatus.

In the first aspect described above, the plurality of lenses may include a projection lens disposed in a position closest to the enlargement side, the lens barrel may include a lens barrel main body and a projection part that extends outward from the lens barrel main body and holds the projection lens, and the first grip may extend outward beyond the projection part.

According to the configuration described above, when the projection optical apparatus is placed on a floor or caused to stand against a wall, the first grip can be readily brought into contact with the floor or the wall before the projection part is. The configuration described above prevents a load from acting on the projection lens held in the projection part. Even when some kind of impact acts on the projection optical apparatus, the impact acts on the first grip before acting on the projection part, whereby damage of the projection lens held in the projection part and in turn damage of the projection optical apparatus can be avoided.

In the first aspect described above, the lens barrel may include a flange that protrudes outward from the lens barrel main body and is coupled to the light emitting apparatus.

The configuration described above allows the projection optical apparatus to be readily installed in the light emitting apparatus. Since the flange protrudes outward from the lens barrel main body, when the projection optical apparatus falls on a floor, the flange comes into contact with the floor before the lens barrel main body does, whereby the projection optical apparatus can be protected.

In the first aspect described above, the projection optical apparatus may include a cover member that covers part of the lens barrel, and the first grip may be inserted through the cover member and attached to the lens barrel.

According to the configuration described above, disengagement of the first grip can be avoided as compared with a case in which the first grip is attached to the cover member. Therefore, even when the projection optical apparatus is heavy, disengagement of the first grip due to the weight of the projection optical apparatus can be avoided. Furthermore, the portion where the first grip is linked to the lens barrel is covered with the cover member, whereby the exterior appearance of the projection optical apparatus can be improved.

In the first aspect described above, the first grip may be removably attached to the lens barrel.

According to the configuration described above, after the projection optical apparatus is attached to the light emitting apparatus, the first grip can be detached from the lens barrel. The exterior appearance of the projection optical apparatus and in turn the exterior appearance of the light emitting apparatus in which the projection optical apparatus is installed can be improved.

In the first aspect described above, the lens barrel may include an attachment part to which the first grip is attached, and the attachment part may be made of metal.

According to the configuration described above, the lens barrel can be robustly configured. Disengagement of the first grip from the lens barrel can thus be avoided, and the user who grips the first grip can stably grip the projection optical apparatus. Even when the projection optical apparatus falls or is otherwise handled so that an impact acts thereon, distortion of the lens barrel can be avoided.

In the first aspect described above, the projection optical apparatus may include a first reflector and a second reflector, and the lens barrel may include a light incident section through which the light emitted from the light emitting apparatus passes along a first optical axis, an intermediate section through which the light that exits out of the light incident section and is reflected off the first reflector passes along a second optical axis that intersects with the first optical axis, and a light exiting section through which the light that exits out of the intermediate section and is reflected off the second reflector passes along a third optical axis that intersects with the second optical axis.

According to the configuration described above, when the direction in which the light passing through the light exiting section travels is opposite to the direction in which the light enters the projection optical apparatus, the light having entered the projection optical apparatus can be emitted in the direction opposite to the direction in which the light enters the projection optical apparatus via a position shifted from the light incident section in the direction in which the light passing through the intermediate section travels. When the direction in which the light passing through the light exiting section travels substantially coincides with the direction in which the light enters the projection optical apparatus, the light having entered the projection optical apparatus can be emitted along the direction in which the light enters the projection optical apparatus via a position shifted from the light incident section in the direction in which the light passing through the intermediate section travels.

In the first aspect described above, the projection optical apparatus may include a second grip extending outward from the exterior of the lens barrel, the first grip may be attached to the light exiting section, and the second grip may be attached to a portion of the lens barrel that is the portion corresponding to the first reflector.

According to the configuration described above, the first and second grips are disposed at one end and the other end in the direction in which the light passing through the intermediate section travels, respectively. In other words, the first and second grips are disposed on opposite sides of the intermediate section. The user can therefore stably hold the projection optical apparatus by gripping the first and second grips.

Instead, a first user can grip the first grip, and a second user can grip the second grip. Multiple persons can therefore readily grip the projection optical apparatus.

In the first aspect described above, the second grip may be so provided that an extension of the first optical axis passes therethrough.

According to the configuration described above, when the projection optical apparatus is installed in the light emitting apparatus, the user can readily install the projection optical apparatus in the light emitting apparatus by gripping the second grip to align the first optical axis with the optical axis of image light. Similarly, the projection optical apparatus can be readily detached from the light emitting apparatus. The projection optical apparatus can therefore be readily installed in and removed from the light emitting apparatus.

A projector according to a second aspect of the present disclosure includes a light exiting apparatus including a light modulator that modulates light outputted from a light source and the projection optical apparatus described above.

The configuration described above can provide the same effects as those provided by the projection optical apparatus described above.

What is claimed is:

1. A projection optical apparatus that is removably installed in a light emitting apparatus and projects light emitted from the light emitting apparatus, the projection optical apparatus comprising:
    a plurality of lenses;
    a first reflector and a second reflector,
    a lens barrel holding the plurality of lenses; and
    a first grip extending outward from an exterior of the lens barrel,
    a second grip extending outward from the exterior of the lens barrel,
        wherein the first grip is removable from the lens barrel when the projection optical apparatus projects light emitted from the light emitting apparatus,
    the lens barrel includes
        a light incident section through which light emitted from the light emitting apparatus passes along a first optical axis,
        an intermediate section through which light emitted from the light incident section and reflected off the first reflector passes along a second optical axis intersecting with the first optical axis, and
        a light exiting section through which light emitted from the intermediate section and reflected off the second reflector passes along a third optical axis intersecting with the second optical axis,
        the first grip and the second grip are attached to the light exiting section.

2. The projection optical apparatus according to claim 1, wherein the plurality of lenses includes a projection lens disposed in a position closest to an enlargement side, the lens barrel includes a lens barrel main body and a projection part extending outward from the lens barrel main body and holding the projection lens, and the first grip extends outward beyond the projection part.

3. The projection optical apparatus according to claim 2, wherein the lens barrel includes a flange protruding outward from the lens barrel main body and coupled to the light emitting apparatus.

4. The projection optical apparatus according to claim 1, further comprising
    a cover member covering part of the lens barrel,
    wherein the first grip is inserted through the cover member and attached to the lens barrel.

5. The projection optical apparatus according to claim 1, wherein the lens barrel includes an attachment part to which the first grip is attached, and
    the attachment part is made of metal.

6. The projection optical apparatus according to claim 1, further comprising
    a third grip extending outward from the exterior of the lens barrel,
    wherein the first grip is attached to the light exiting section, and
    the third grip is attached to a portion of the lens barrel that is a portion corresponding to the first reflector.

7. The projection optical apparatus according to claim 6, wherein the second grip is disposed on an extension of the first optical axis.

8. A projector comprising:
    a light exiting apparatus including a light modulator modulating light emitted from a light source; and
    the projection optical apparatus according to claim 1.

9. The projection optical apparatus according to claim 1, wherein the first grip is arranged in a first direction intersecting the optical axis of the light exiting section respecting to the second grip.

10. The projection optical apparatus according to claim 1, further comprising:
    a fourth grip extending outward from the exterior of the lens barrel,
    wherein the fourth grip is attached to the light exiting section, and
    the fourth grip is arranged in a second direction intersecting the optical axis of the light exiting section and the first direction respecting to the first grip.

* * * * *